United States Patent
Wagner et al.

(10) Patent No.: US 8,978,467 B2
(45) Date of Patent: Mar. 17, 2015

(54) METHOD AND APPARATUS FOR PROVIDING TWO WAY CONTROL AND DATA COMMUNICATIONS TO AND FROM TRANSPORTATION REFRIGERATION UNITS (TRUS)

(75) Inventors: Ronald E. Wagner, Fleming Island, FL (US); Rex T. Logan, Superior, CO (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 489 days.

(21) Appl. No.: 12/807,917

(22) Filed: Sep. 16, 2010

(65) Prior Publication Data

US 2014/0052888 A1    Feb. 20, 2014

Related U.S. Application Data

(60) Provisional application No. 61/342,129, filed on Apr. 9, 2010.

(51) Int. Cl.
*F25D 29/00* (2006.01)
*H04Q 9/00* (2006.01)

(52) U.S. Cl.
CPC .............. *H04Q 9/00* (2013.01); *F25D 29/003* (2013.01); *H04Q 2209/40* (2013.01); *H04Q 2209/823* (2013.01)
USPC ....................................................... 73/432.1

(58) Field of Classification Search
CPC ..................................................... F25D 29/003
See application file for complete search history.

(56) References Cited

U.S. PATENT DOCUMENTS

| | | | | |
|---|---|---|---|---|
| 5,359,522 A * | 10/1994 | Ryan | ............................ | 705/413 |
| 5,917,433 A * | 6/1999 | Keillor et al. | ................ | 340/989 |
| 5,999,091 A * | 12/1999 | Wortham | ...................... | 340/431 |
| 6,354,093 B2 * | 3/2002 | Davis et al. | ....................... | 62/89 |
| 6,952,642 B1 * | 10/2005 | Cowen | .......................... | 701/113 |
| 7,294,026 B1 * | 11/2007 | Donnell et al. | ............... | 439/701 |
| 2004/0210419 A1 * | 10/2004 | Wiebe et al. | ................. | 702/182 |

* cited by examiner

*Primary Examiner* — Peter Macchiarolo
*Assistant Examiner* — Nathaniel Kolb
(74) *Attorney, Agent, or Firm* — Daniel J. Long

(57) ABSTRACT

An RS-485 bus is directly connected to transportation refrigeration unit sensors for transmitting information from the sensors to a remote location and for controlling sensor parameters from the remote location. The GENSET associated with the transportation refrigeration unit also utilizes the RS-485 bus, in which the bus is directly connected to the GENSET sensors for bi-directional communication therewith.

21 Claims, 7 Drawing Sheets

Transportation Refrigeration Unit Sensors

Temperature Sensors:
1) Supply Air Sensor, LH
2) Supply Air Sensor, RH
3) Return Air Sensor
4) Evaporator Coil Sensor
5) Condenser Coil Sensor
6) Compressor Top Cap
7) Ambient Air Sensor
8) USDA Spare1 Sensor
9) USDA Spare2 Sensor
10) USDA Spare3 Sensor
11) USDA Spare4 Cargo Sensor Other Sensors:
1) Humidity Sensor
2) AFAM+ (Advanced Fresh Air Management Plus) $CO_2$ Gas Sensor (Opt)
3) Compressor Discharge Line Temperature Sensor
4) High Pressure Cutout Switch / Discharge Pressure Sensor
5) Low Pressure Cutout Switch / Suction Pressure Sensor
6) Phase Measuring Circuits
7) Current Measuring Circuits

*Fig. 2*

Reefer Management System Test

Modem appears to be offline.

| Supply 1: | -17.6 °C | Humidity | 53 % | Alarm: | off |
|---|---|---|---|---|---|
| Supply 2: | -17.9 °C | AVL | -- | Temp Set Pt: | -1.8 °C |
| Return: | -9.6 °C | Suction | -- | Capacity Load: | 100 |
| Evaporator1: | -16.9 °C | Discharge | -- | DI-LPCO: | off |
| Condenser: | -13.2 °C | Line Voltage | 479.8V | DI-HPCO: | Not used |
| Compressor: | 75.4 °C | Line Freq. | 59.5Hz | DO-Economizer: | On |
| Compressor: | -- | Current ch1 | 11.1A | DO-Digi Valve: | Off |
| Ambient: | 31.7 °C | Current ch2 | 10.9A | Power DOs: | |
| Cargo 1: | -14.3 °C | Current ch3 | 9.9A | -Heater: | Off |
| Cargo 2: | -4.9 °C | $CO_2$ | -- | -Compressor: | On |
| Cargo 3: | -- | $O_2$ | -- | -Evaporator High: | Off |
| Cargo 4: | -- | | | -Evaporator Low: | On |
| | | | | -Condenser Fan: | On |

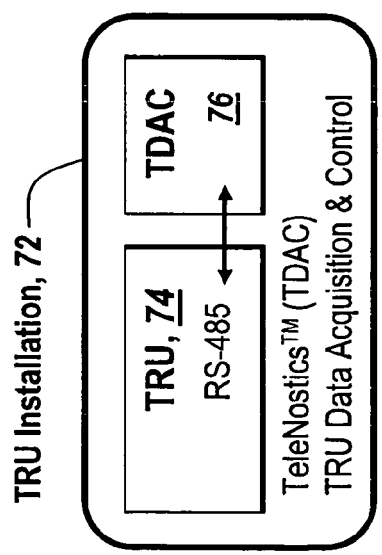

TRU Installation, 72

TeleNostics™ (TDAC)
TRU Data Acquisition & Control

*Fig. 5*

METHOD AND APPARATUS FOR PROVIDING TWO WAY CONTROL AND DATA COMMUNICATIONS TO AND FROM TRANSPORTATION REFRIGERATION UNITS (TRUS)

RELATED APPLICATIONS

This Application claims rights under 35 USC §119(e) from U.S. Application Ser. No. 61/342,129 filed Apr. 9, 2010, the contents of which are incorporated herein by reference.

FIELD OF THE INVENTION

This invention relates to the utilization of a 485 transfer bus and more particularly to the utilization of such a bus to provide two way communications to and from transportation refrigeration unit.

BACKGROUND OF THE INVENTION

Transportation refrigeration units are utilized in the transport of perishable goods, with the temperature and environmental controls being critical to the arrival of the perishable goods without damage or spoilage. Typical transportation refrigeration units have sensors within the units to provide data back to a central processing location so that temperature and/or humidity as well as the operating condition of refrigeration units during transportation can be monitored.

Typically units such as Thermo King and the like provide an RS-232 bus. However, for each of the transportation refrigeration units there are multiple sensors that can be activated or provided to sense various conditions depending on the load. Moreover, with varying load requirements come varying requirements for the refrigeration unit itself including requirements not only for the refrigeration unit but also for the electrical generator which powers the unit.

Thus, there has been a problem with the use of only the RS-232 bus to be able to provide adaptability to different loads, to be able to set sensors to different parameter levels and to be able to activate certain sensors as well as to provide control of the sensors that are activated.

In the case of transportation refrigeration units, the sensors are those associated with food products. The sensors could be spoilage sensors, sensors to determine changes in temperature, and additional sensors inside the transportation refrigeration unit to monitor temperature at different places, since temperature is not necessarily uniform throughout a unit. Note, there is oftentimes a requirement to be able to add additional sensors to a single temperature sensor and there is a requirement to be able to add the sensors and control the sensors remotely.

Present transportation refrigeration units today pass data through the traditional RS-232 interface. However, the RS-232 interface does not support multiport direct communications with the sensor system to permit listening in directly to each of the sensors and to query selected sensors.

Also with sensors, there is a necessity to provide a control bus because it is important to be able to control the signal-to-noise ratio. This is done by adjusting sensor parameters and an RS-232 data bus does not have a signal-to-noise control capability.

SUMMARY OF INVENTION

In order to provide for increased functionality to be able to at the very least calculate signal-to-noise ratios having to do with transportation refrigeration units, as well as to be able to provide additional sensors and to set the parameters thereof, in the subject invention an RS-485 control bus architecture is utilized to provide the ability to control sensor parameters to improve the signal-to-noise ratio. This is accomplished by fine tuning the sensors remotely.

One of the objectives of the subject invention is to be able to adjust sensors inside the transportation refrigeration unit to sense temperature and other changes based on observed data. It is noted that various perishable items have different observed temperature differentials indicating spoilage. For instance, bananas need to be controlled to within plus or minus 1 degree Fahrenheit of a stable temperature in order to arrive fresh, whereas avocados do not have a critical temperature component. Other perishables might need plus or minus 10% temperature control to prevent spoilage.

There is therefore a necessity to be able to change the sensor parameters based on the load and to be able to control these sensors remotely to correspond to the perishable load involved. The subject RS-485 control bus provides for a mechanism of reconfiguring perishable food sensors to correspond to the particular load involved. This is unlike the RS-232 bus because it permits direct listening into sensor outputs to be able to issue the appropriate commands. Also, the RS-485 bus allows or facilitates multiple additional sensors.

In summary, an RS-485 bus is directly connected to transportation refrigeration unit sensors for transmitting information from the sensors to a remote location and for controlling sensor parameters from the remote location due to the connect sensors to RS-485 bus. GENSET associated with transportation refrigeration units utilizes the RS-485 bus directly connected to its sensors for bi-directional communication directly to the sensors.

BRIEF DESCRIPTION OF THE DRAWINGS

These and other features of the subject invention will be better understood in connection with the Detailed Description, in conjunction with the Drawings, of which:

FIG. 2 is a listing of the type of sensors that are associated with transportation refrigeration units;

FIG. 5 is a diagrammatic illustration of a transportation refrigeration unit and TDAC module illustrating the sensing of the various parameters associated with a particular load.

DETAILED DESCRIPTION

Figure 1:
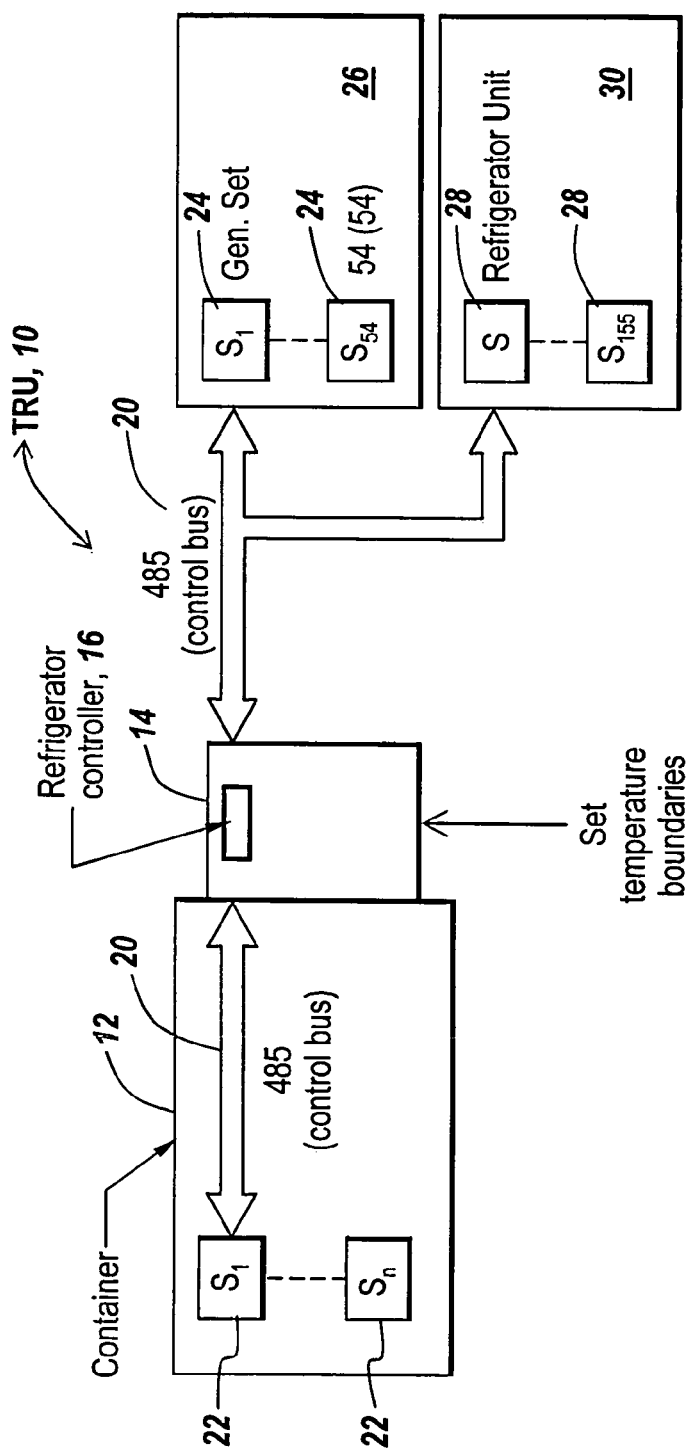
FIG. 1 is a diagrammatic illustration of a temperature refrigeration unit including a container, a refrigerator and controller and a control bus that runs between the controller and GENSET sensors and refrigeration unit sensors.

Referring now to FIG. 1, a TRU 10 includes a container 12, a refrigeration unit 14 and a refrigerator controller 16, in which the refrigeration unit is set by its controller to operate between predetermined temperature boundaries. Controller 16 is coupled via a RS-485 control bus 20 not only to sensors 22 within the container but also to sensors 24 within the generator or GENSET 26 and sensors 28 within the refrigeration unit 30. It will be appreciated that in one embodiment there may be as many as 11 sensors in the container to monitor temperature, air flow and other parameters; whereas there may be as many as 54 sensors in the GENSET to monitor electrical parameters, fan speed and pressure in the refrigeration unit. Finally, there may be as many as 155 sensors in the refrigeration unit itself.

Referring to FIG. 2, various of the transportation refrigeration unit sensors include for instance temperature sensors which monitor the left hand and the right hand supply air temperatures as well as return air temperature. Moreover, there may be an evaporator coil sensor or condenser coil sensor, a compressor top cap sensor and an ambient air temperature sensor. Additionally, four USDA specified spare sensors are listed that make up the temperature sensing package for the transportation refrigeration unit Other sensors can include a humidity sensor, an advanced fresh air management system plus sensor and a $CO_2$ gas sensor.

Moreover, sensors can include compressor discharge line temperature sensors, high pressure cutout switch/discharge pressure sensors, low pressure cutout switch/suction pressure sensors, phase measuring circuits and current measuring circuits.

What will be appreciated is that for transportation refrigeration units there are many different parameters that need to be monitored and controlled so that spoilage is minimized or eliminated.

Figure 3:
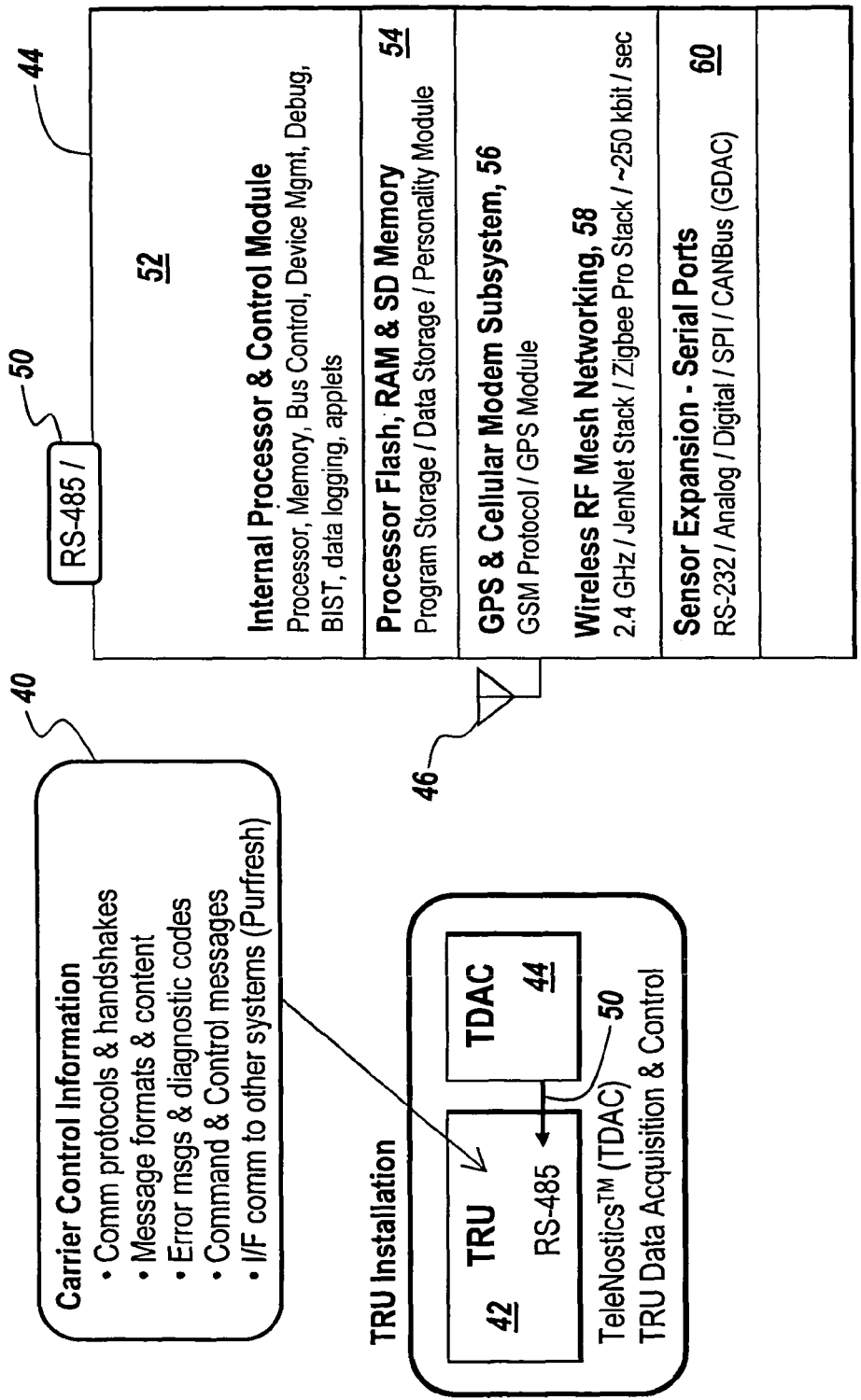
FIG. 3 is a TRU Data Acquisition and Controller (TDAC) diagram describing the operation of the subject system illustrating the use of the RS-485 bus.

Referring to FIG. 3, a TRU Data Acquisition and Control (TDAC) block diagram is illustrated in which as illustrated at 40 carrier control information includes communication protocols and handshakes, message formats and content, error messages, diagnostic codes, command and control messages and I/F communication to other systems such as the Purfresh system. All of these control protocols are utilized to control TRU 42 through the communication of this information via TDAC module 44 coupled to TRU 42 utilizing an RS-485 connection.

This information can be wirelessly transmitted to the TRU as illustrated by antenna 46 on TDAC module 44 which is connected by the RS-485 interface 50 to the TRU. Module 44 includes an internal processor and control module 52 which includes a processor, memory, bus control, device management, debug, BIST, data logging and applets.

Module 44 also includes processor flash, RAM and SD memory to provide programs storage, data storage and to provide a personality module, here as illustrated at 54.

Also within TRU 42 is a GPS and cellular modem subsystem 56 that has a GSM protocol in one embodiment and a GPS module, whereas wireless RF mesh networking is provided as illustrated at 58 within this module which may include a 2.4 gigahertz/JenNet stack/Zigbee Pro Stack all operating at approximately 250 kilobits per second.

Finally, there are sensor expansion and serial ports available at 60 that include RS-232 buses, analog buses; digital/SPI/CAN buses and other buses.

Figure 4:
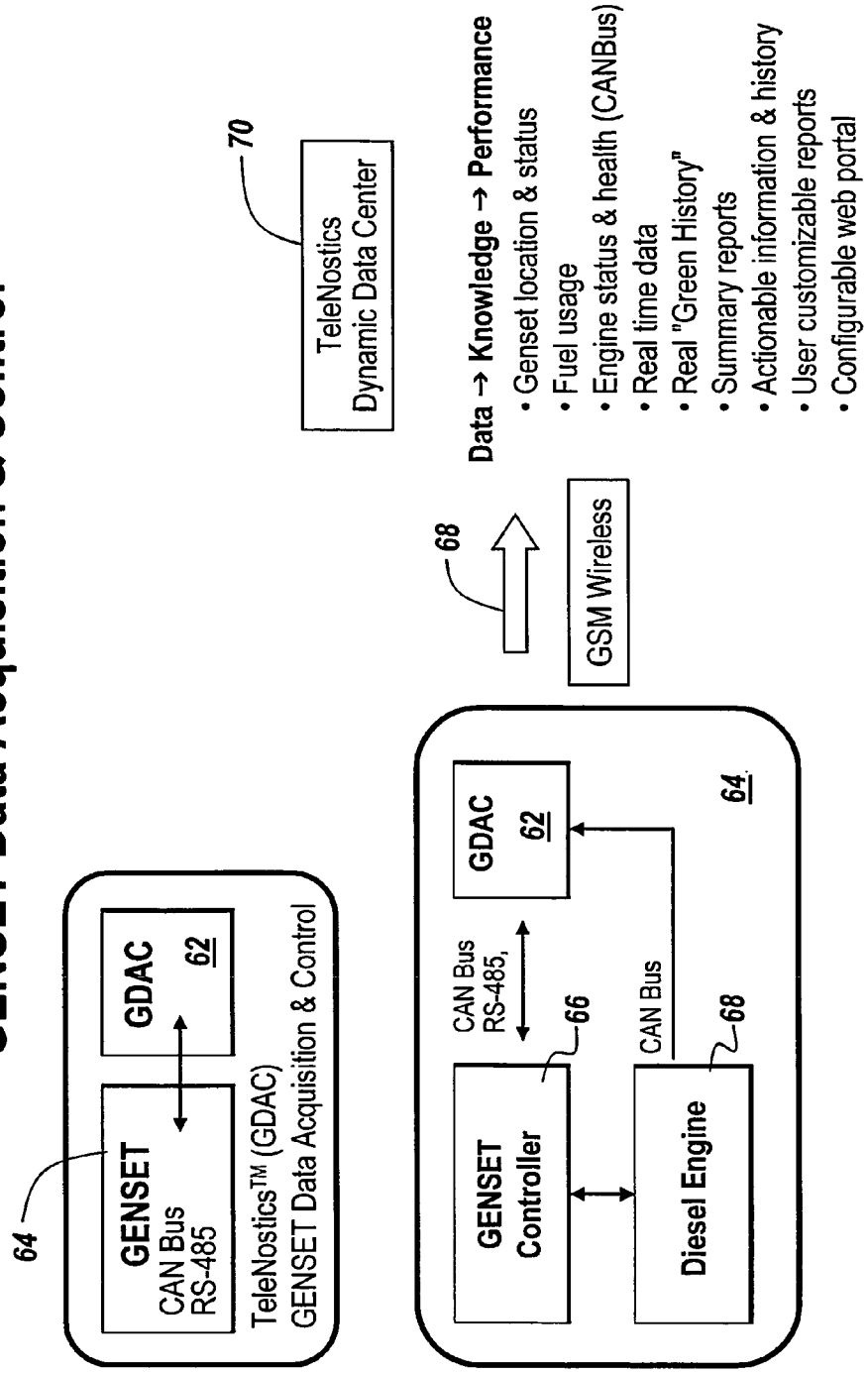
FIG. 4 is a diagrammatic illustration of GENSET data acquisition and control scenario using a GENSET and GENSET Data Acquisition and Controller (GDAC) in which the GENSET and its sensors are controlled over an RS-485 bus.

Referring now to FIG. 4, a GENSET Data Acquisition and Control (GDAC) module 62 is connected to a GENSET 64 in part via an RS-484 bus. GENSET 64 in one embodiment including a GENSET controller 66 coupled to a diesel engine 68, with the GENSET controller coupled to GDAC 62 using an RS-485 bus. The GENSET controller module is connected via GSM wireless as illustrated at 68 so that if the GDAC module is coupled to a telenostics dynamic data center, various controls can be applied to the GENSET itself. These controllers involve the use of data and a knowledge based system to improve performance. Thus for instance GENSET location and status, fuel usage, engine status and health, realtime data, real "green history", summary reports, actionable information history, user customizable reports and a configurable web portal are supported by the RS-485 configuration.

Referring to FIG. 5, what is shown is a TRU installation 72 in which a TRU 74 is coupled to a TDAC 76 in part through the utilization of an RS-485 bus. Here a reefer management system test is illustrated showing the type of information that is available over the RS-485 bus.

Figure 6:
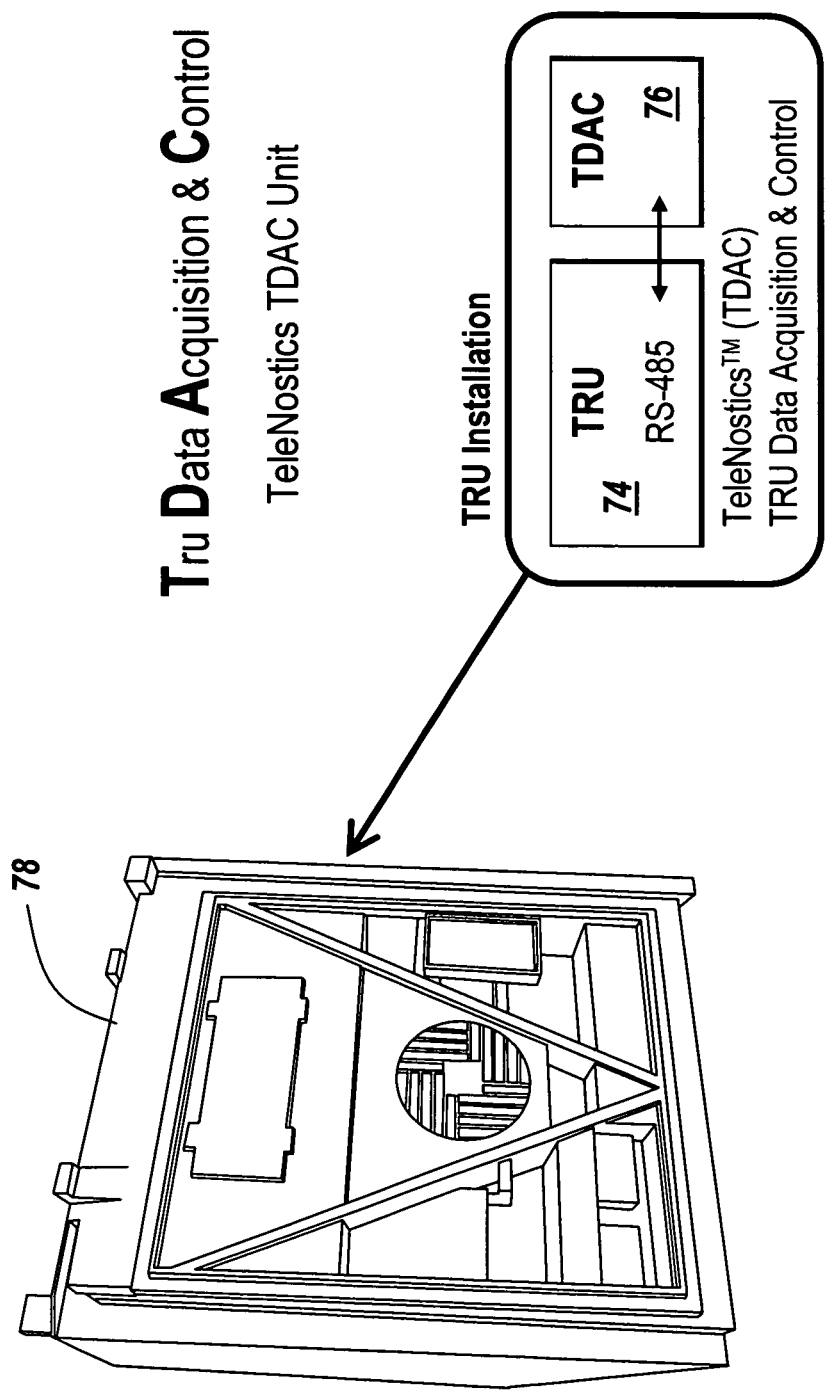
FIG. 6 is a diagrammatic illustration of a TRU Data Acquisition and Control unit coupled to a transportation refrigeration unit, again illustrating the utilization of an RS 485 bus.
Figure 7:
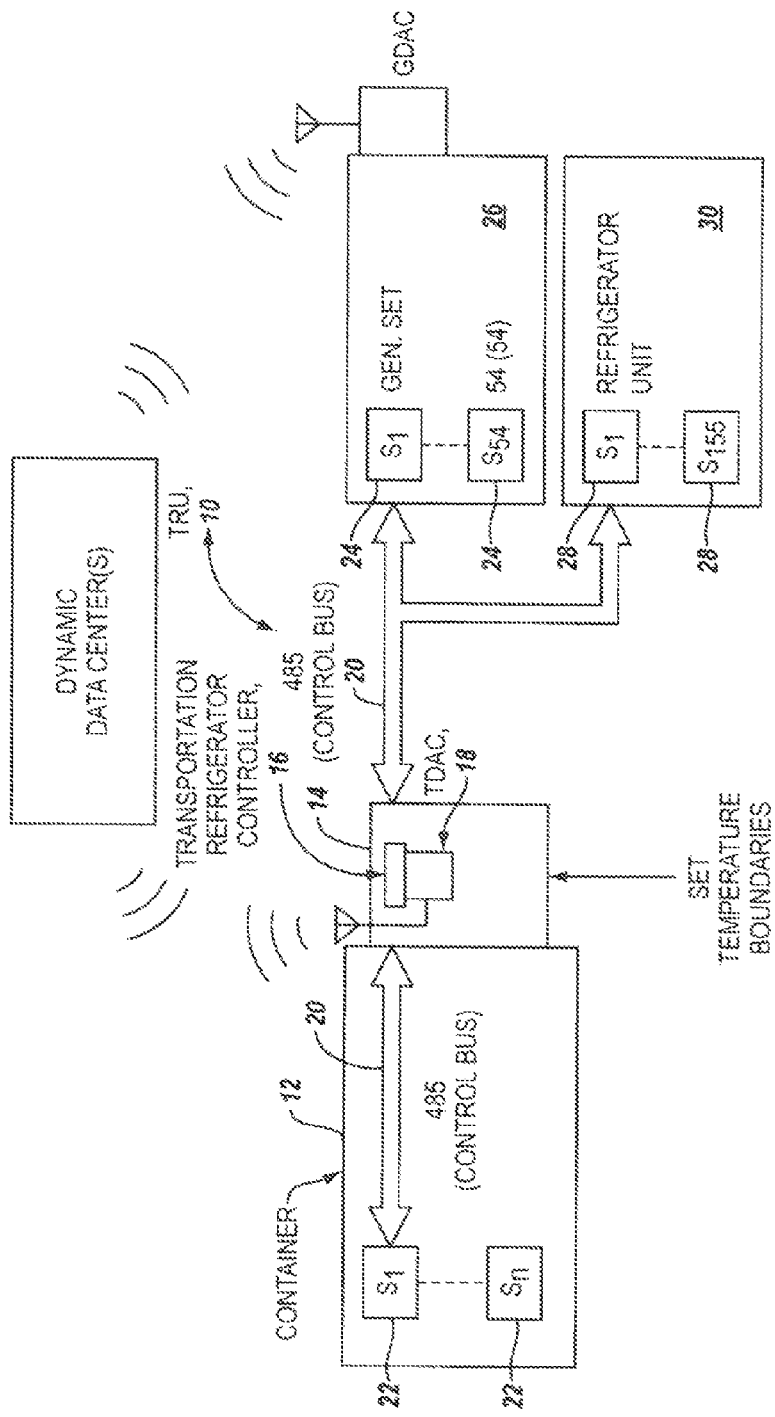
FIG. 7 is a diagrammatic illustration of another temperature refrigeration unit including a container, a refrigerator and controller and a control bus that runs between the controller and GENSET sensors and refrigeration unit sensors.

Referring to FIG. 6 the TRU Data Acquisition and Control module 76 coupled to TRU 74 is illustrated as controlling a Thermo King transportation refrigeration unit 78, the data of FIG. 5 being culled from the operation of this TRU.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is

1. A method for controlling sensors utilized in a transportation refrigeration unit including a container and having a refrigeration unit controller and a GENSET to power said transportation refrigeration unit, comprising:

coupling the transportation refrigeration unit to a transportation refrigeration unit data acquisition and control module via an RS-485 control bus for controlling the transportation refrigeration unit, wherein the transportation refrigeration unit data acquisition and control module is wirelessly connected to one or more dynamic data centers for remote bi-directional communication;

coupling the GENSET to a GENSET data acquisition and control module via the RS-485 control bus, wherein the GENSET is controlled through an input from the one or more dynamic data centers wirelessly transmitted to the GENSET data acquisition and control module;

coupling the refrigeration unit controller to the GENSET via the RS-485 bus;

providing the same RS-485 control bus to couple refrigeration unit sensors, GENSET sensors, and container sensors to the refrigeration unit controller, wherein the RS-485 bus is directly connected to the sensors, the RS-485 bus provides bi-directional communication with the sensors to be able to set sensor parameters and to be able to monitor sensor outputs;

monitoring the refrigeration unit sensors, GENSET sensors, and container sensors utilizing the RS-485 bus; and controlling the refrigeration unit sensors, GENSET, GENSET sensors, and container sensors with wireless signals communicated to the transportation refrigeration unit data acquisition and control module and the GENSET data acquisition and control module from the one or more dynamic data centers.

2. The method of claim 1, wherein the RS-485 bus supports at least one of GENSET location, status, fuel usage, engine health, realtime data, environmental history, actionable information history, user customs report, and a web portal.

3. The method of claim 1, wherein the refrigeration unit controller includes at least one of a processor, a memory, bus control architecture, device management protocols, de-bug protocols, BIST, data logging applications, and applets.

4. The method of claim 1, wherein the sensors include a temperature sensor.

5. The method of claim 4, wherein the temperature sensor includes an air temperature sensor.

6. The method of claim 1, wherein the sensors include an evaporator coil sensor.

7. The method of claim 1, wherein the sensors include a condenser sensor.

8. The method of claim 1, wherein the sensors include a compressor top cap sensor.

9. The method of claim 1, wherein the sensors include an ambientair temperature sensor.

10. The method of claim 1, wherein the sensors in a humidity sensor.

11. The method of claim 1, wherein the sensors include a fresh air management sensor.

12. The method of claim 1 wherein the sensors include a $CO_2$ sensor.

13. The method of claim 1, wherein the sensors include a compressor discharge line temperature sensor.

14. The method of claim 1, wherein the sensors include a high pressure cut out switch sensor.

15. The method of claim 14, wherein the high pressure cut out switch controls discharge and wherein the high pressure cut out switch sensor senses discharge pressure.

16. The method of claim 1, wherein the sensors include a low pressure cut out switch sensor.

17. The method of claim 16, wherein the low pressure cut. out switch controls discharge pressure and wherein the low pressure cut out switch sensor senses discharge pressure.

18. The method of claim wherein the sensors include an electric phase measuring sensor.

19. The method of claim 1, wherein the sensors include a current measuring sensor.

20. The method of claim I wherein the transportation refrigeration unit data acquisition and control module comprises of a processor, a processor flash, a random access memory, a secure digital memory, a global positioning system, a cellular modem subsystem, a wireless radio frequency mesh networking and a set of sensor expansion serial ports.

21. The method of claim 1, wherein the transportation refrigeration unit data acquisition and control module utilizes one or more types of carrier control information to control the function of the transportation refrigeration unit, wherein the types of carrier control information comprise one or more communication and handshake protocols, one or more message formats and contents, one or more error messages, one or more diagnostic codes, one or more command and control messages function interface communication to other systems.

* * * * *